(12) United States Patent
Boldyshev

(10) Patent No.: US 11,080,251 B1
(45) Date of Patent: Aug. 3, 2021

(54) OPTIMIZATION OF MEMORY USAGE WHILE CREATING HASH TABLE

(71) Applicant: Comodo Security Solutions, Inc., Clifton, NJ (US)

(72) Inventor: Viktor Boldyshev, Odessa (UA)

(*) Notice: Subject to any disclaimer, the term of this patent is extended or adjusted under 35 U.S.C. 154(b) by 90 days.

(21) Appl. No.: 16/166,576

(22) Filed: Oct. 22, 2018

Related U.S. Application Data

(60) Provisional application No. 62/575,906, filed on Oct. 23, 2017.

(51) Int. Cl.
G06F 16/22 (2019.01)
G06F 16/245 (2019.01)
G06F 17/18 (2006.01)

(52) U.S. Cl.
CPC ...... G06F 16/2255 (2019.01); G06F 16/2272 (2019.01); G06F 16/245 (2019.01); G06F 17/18 (2013.01)

(58) Field of Classification Search
USPC ....................................................... 707/747
See application file for complete search history.

(56) References Cited

U.S. PATENT DOCUMENTS

| 5,924,098 | A | * | 7/1999 | Kluge | G06F 9/52 |
| 6,067,547 | A | | 5/2000 | Douceur | |
| 6,202,203 | B1 | * | 3/2001 | Ng | G06F 8/443 |
| | | | | | 717/151 |
| 6,453,404 | B1 | | 9/2002 | Bereznyi et al. | |
| 6,578,131 | B1 | | 6/2003 | Larson et al. | |
| 7,287,131 | B1 | * | 10/2007 | Martin | G06F 16/9014 |
| | | | | | 711/154 |
| 7,370,054 | B1 | * | 5/2008 | Martin | G06F 16/9014 |
| | | | | | 707/747 |
| 7,702,628 | B1 | * | 4/2010 | Luchangco | G06F 16/9014 |
| | | | | | 707/999.006 |
| 7,797,687 | B2 | * | 9/2010 | Tillmann | G06F 11/3684 |
| | | | | | 714/38.14 |
| 9,081,672 | B1 | * | 7/2015 | Nemes | G06F 12/0253 |
| 9,135,833 | B2 | * | 9/2015 | Guleria | G09C 1/00 |
| 9,280,573 | B2 | | 3/2016 | Yue | |
| 9,639,566 | B2 | * | 5/2017 | Olshanetckii | G06F 16/245 |
| 9,892,237 | B2 | * | 2/2018 | Greenfield | G16C 99/00 |
| 10,275,225 | B1 | * | 4/2019 | Sunarno | G06F 9/45554 |
| 10,599,647 | B2 | * | 3/2020 | Balkesen | G06F 16/2255 |
| 10,733,171 | B2 | * | 8/2020 | Park | G06F 16/2343 |
| 10,810,207 | B2 | * | 10/2020 | Balkesen | G06F 16/2255 |

(Continued)

FOREIGN PATENT DOCUMENTS

CN          102609441 B       6/2014

OTHER PUBLICATIONS

Nikolas Askitis Fast and Compact Hash Tables for Integer Keys School of Computer Science and Information Technology, RMIT University, Melbourne 3001, Australia.

*Primary Examiner* — Cam Linh T Nguyen
(74) *Attorney, Agent, or Firm* — Joseph P. Aiena

(57) ABSTRACT

There is provided a method to optimize memory usage in hash tables by organizing data storage in the hash table with arrays instead of linked lists where sizes of arrays can be predicted with high accuracy. The method has certain conditions and range of applicability, including where hash function of key provides uniform distribution of values. The method is more applicable if the number of entries is more than 60,000.

10 Claims, 13 Drawing Sheets

(56) References Cited

U.S. PATENT DOCUMENTS

| | | | |
|---|---|---|---|
| 2003/0204698 A1 | 10/2003 | Sachedina et al. | |
| 2004/0107227 A1* | 6/2004 | Michael | G06F 9/5022 |
| 2007/0033576 A1* | 2/2007 | Tillmann | G06F 11/3688 |
| | | | 717/124 |
| 2008/0021908 A1 | 1/2008 | Trask et al. | |
| 2011/0173173 A1* | 7/2011 | Hall | G06F 16/355 |
| | | | 707/706 |
| 2011/0258532 A1* | 10/2011 | Ceze | G06F 16/9574 |
| | | | 715/234 |
| 2011/0283082 A1 | 11/2011 | McKenney et al. | |
| 2016/0170649 A1* | 6/2016 | Ramesh | G06F 3/0623 |
| | | | 711/165 |
| 2017/0344546 A1 | 11/2017 | Nam | |

* cited by examiner

Linked List

Array

OPTIMIZATION OF MEMORY USAGE WHILE CREATING HASH TABLE

CROSS REFERENCE TO RELATED APPLICATIONS

This application claims benefit of and priority to U.S. Provisional Application Ser. No. 62/575,906 filed on Oct. 23, 2017, incorporated herein by reference in its entirety.

BACKGROUND

Hash table is a key-value structure providing a fast search by key. Value can be any byte sequence, any object. Key for a given value is the byte sequence which is calculated using this value with a certain algorithm which is called hash function. If two different values have the same key, this situation is called collision. For memory optimization, the keys can be united into groups (slots, buckets). Hitting several keys into one group is called collision also.

At present the following algorithm is used for creating hash tables. Suppose there are N objects that need to be added to the hash table. Consistently the key for each object is calculated using a hash function. If the hash value range is small, array can be created with size equal to this value range and the specified N objects can be placed in cells with indexes equal to the hash keys of the corresponding objects. Thus a high speed of access to the object by the key is achieved. But if the range of the hash values is large, it is irrational (or impossible at all) to create an array of this size. Therefore the entire range is divided into groups. The number of groups is chosen based on the requirements for memory size and search speed.

The method of division into groups is arbitrary, but it should be easy to calculate the group number of the certain key. Further there is created an array of the size equal to the number of groups, and each new object is added to the group that includes its key. Search for an object in such a table is implemented as follows: the hash key of an object is calculated, the group of the key is calculated, and all the elements of the group are sequentially searched until the required key is found or the elements in the group expire. This process is called "collision resolution."

One of the currently used methods for resolving collisions is separate chaining. All elements of the group are stored in a linked list. The array element containing a group points to the first element of the linked list (or null if the group is empty). Resolution of the collision is carried out by sequential search through the corresponding linked list.

The advantage of this method is the dynamic allocation of memory for creating new elements of the list: the size of the group can be easily changed. Disadvantage is that each element of the linked list has link to the next element. In a 64-bit system the size of the link is 8 bytes; with a large number of entries in the hash table the overhead of links can be large, especially with small sizes of stored objects. To reduce the number of links there can be used instead of a linked list an array or a sequence of arrays to store the elements of the group. The advantage of this method is the absence of additional references in each element. The disadvantage is that the size of the array is not known previously. Creating an array larger than necessary will result in memory overuse, and if the size is smaller, it is necessary to create a new array of the correct size, copy all the elements into it, and that leads to fragmentation of memory and inefficient use of it.

Thus there is need in new method and system of effective memory allocation when hash table is created.

SUMMARY OF INVENTION

The present invention discloses method and system to optimize memory usage in hash tables by organizing data storage in the hash table with arrays instead of linked lists where sizes of arrays can be predicted with high accuracy. This will combine the advantages of the previous methods, avoiding their disadvantages.

The invention has certain conditions and range of applicability. Here hash function of key must provide uniform distribution of values. Also expected number of records should be known precisely or approximately. The application of the invention will be reasonable if the number of entries is more than 60,000.

The method of the present invention supposes that groups containing keys will be swapped, but in order to free CPU from the copying from memory to memory it is possible to use direct memory access (DMA), which will increase the efficiency of the method. Also, the present invention's method is applicable for hash set structure which contains keys only (without values).

The memory usage in a hash table is optimized by the following manner. First, a data storage in the hash table, which includes keys and values, is organized. Such storage can be also organized in the hash table which includes keys only. Then for each real object the key is calculated using a hash function, further the keys are united in groups. All elements of the groups are stored in arrays instead of linked lists. Sizes of these arrays are predicted by applying binomial distribution method.

To apply binomial distribution method for determining the sizes of the arrays, first the size of the group of keys is determined. It is calculated for each real object in the hash table as a subject to the binomial distribution. Then there is determined the total number of records in the hash table and the number of groups. Further, the probability that the key will go to the certain group is found. Binomial distribution is approximated to the Gaussian normal distribution if the total number of records is large enough and if the hash function provides a uniform distribution of hash values over the entire value range. Finally, the average group size and dependence between number of groups and the group size is determined.

The data storage in the hash table with the arrays instead of linked lists is organized by creating the groups with sizes calculated using binomial distribution method. The groups are distributed randomly through the hash table. Then, the random distribution is corrected to actual distribution by searching a larger group, which is filled as the current group or less if required actual size of the current group is more than randomly distributed. To add the new element to the already full group, the following steps are applied: copying the content of the current group into the found group, copying the content of the found group into the current group and then swapping these two groups by exchanging corresponding links in the groups' array. As a result the current group has extra free space to add new element.

The invention method reduces the memory space required for certain system operation and speeds up the access to each element by using the array, which elements are located in memory one after another, for storing elements of the group instead of linked list. Also the size of each group from the hash table is determined before it is filled, what makes it possible to store them in the array.

The method of the present invention reduces the memory fragmentation as well. For this, the size of the array is determined preliminarily and adjusted while the hash table is being filled. The new array of a bigger size is created if the size of the previous array is not enough for storage of all groups' elements. The data from previous array is copied to the new array and the previous array is deleted. The memory block, that contained a deleted array, is marked as free for further usage by a process for storage of other objects.

The method of the present invention can be successfully applied in database management systems. For such systems, the hash index for the hash table with several entries is created using the following steps. There is presented the hash table T with the number of entries N and the field F for which the hash index is being created. The number of groups is chosen and the groups with sizes calculated using binomial distribution method are created. The groups are placed in the hash table in random order. The hash sum for the field F is calculated and the number of the group Cn is found based on this sum. Then, the hash sum is placed in the group if the group Cn is not full, and next entry is considered. If the group Cn is full, the larger group Cb, with not more elements than in group Cn, is searched for. If the group Cb is found, the groups Cb and Cn are swapped without swapping their content, so the Cn group has free space. The hash sum is placed in the group Cn and the next entry is considered. If the group Cb is not found, new group Cn2, which is bigger than Cn, is created and the content of the group Cn is copied there. The hash sum is placed to the group Cn2 and the group Cn is deleted, therefore the hash index of the hash table T for the field F is created.

The method of the present invention can also be applied for microcontrollers or for systems with small on-chip memory, correspondingly the hash index is calculated for data located in microcontroller memory.

There is distribution of size of the group parameter or left and right distribution limits. It means that there are minimal and maximal sizes of the groups, and the probability that the groups of smaller or bigger sizes do not appear is very high. To calculate this distribution limit, the following steps can be used. The size of the group and a small increment on which the size of the group is gradually increased for defining the right distribution limit are determined. The area of the figure, limited by lines, indicating the size of groups on axis of abscissa, axis of abscissa and a distribution function, is calculated. The current right distribution limit is increased for the small increment, if the resulted area of the figure is less than half of the amount of number of groups multiplied in 0.999. The area of the figure is calculated again. Further, the algorithm is repeated till the area equals the amount of number of groups multiplied in 0.999. The right distribution limit is determined as maximal size of the group received in the result of the calculations. The left distribution limit is symmetric to the right distribution limit respectively to the group size.

Effectiveness of the method of the present invention increases if the size of the value is relatively small, nevertheless there is some gain in memory usage for any size of link and size of value. So the lesser the size of the value in the array, the more gain in memory usage is obtained in comparison with linked list method.

DETAILED DESCRIPTION

The current invention is a method and system to optimize memory usage when creating hash table by effective applying binomial distribution.

Figure 1A:
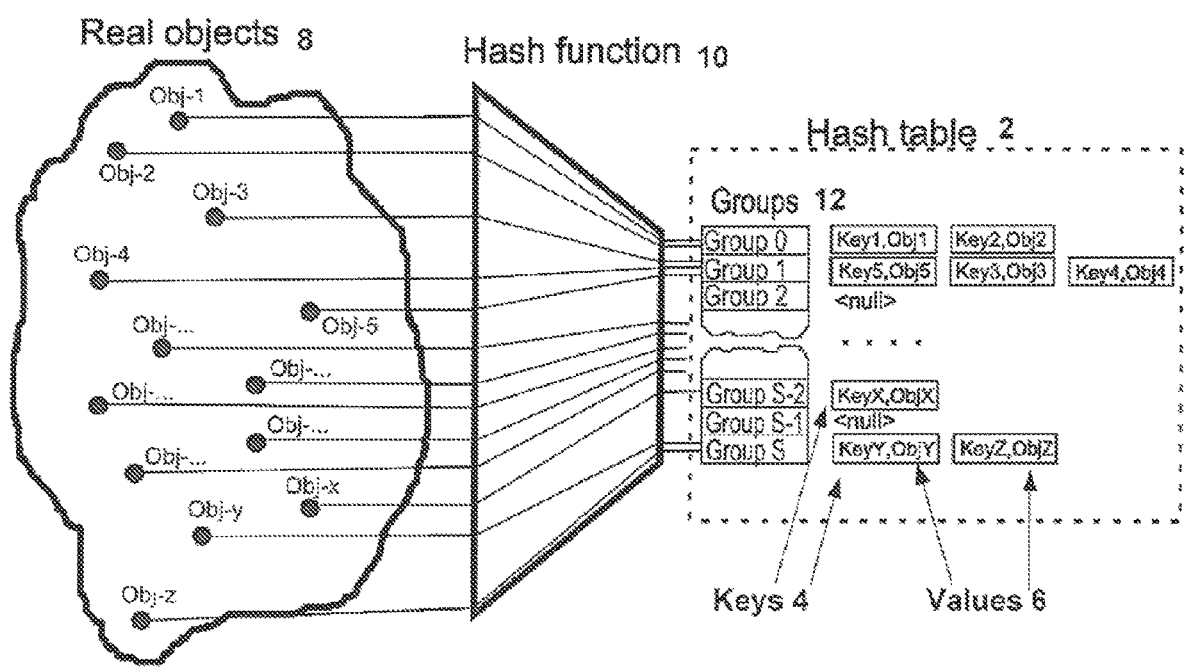
FIG. 1A is a depiction of elements of the invention.
Figure 1B:
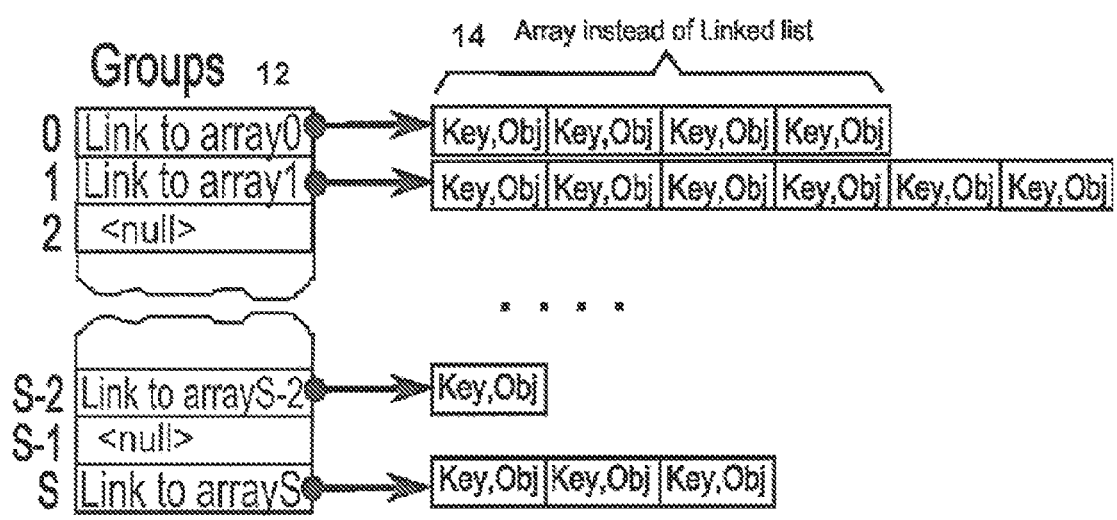
FIG. 1B is a depiction of elements of the invention.

FIG. 1A and FIG. 1B show depiction of elements of the invention. There is a hash table 2 comprising keys 4 and values 6. Key 4 is calculated for each real object 8 using a hash function 10. Afterwards keys 4 are united in groups 12. To store the elements of the groups 12 there are used arrays 14.

Figure 2:
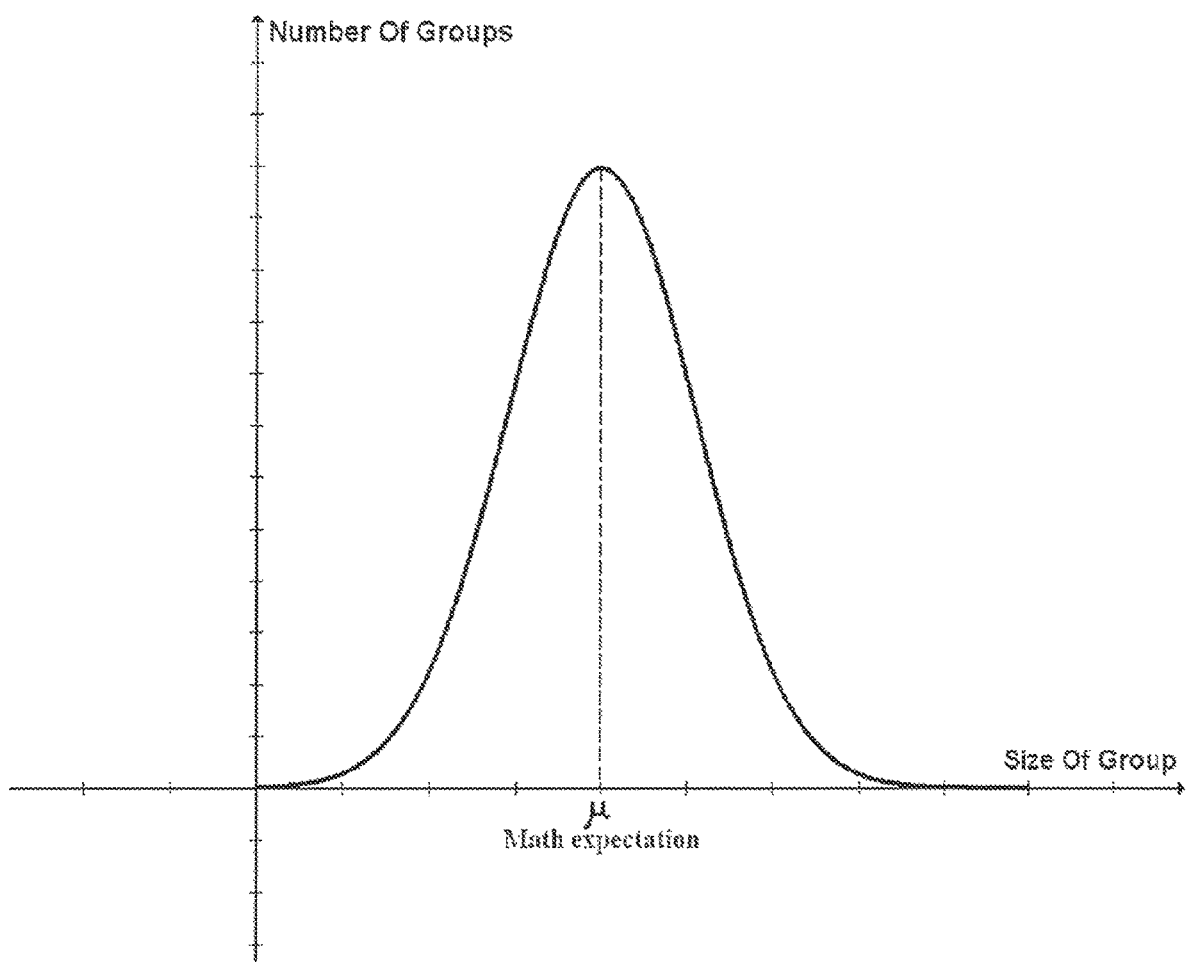
FIG. 2 depicts the graph showing dependence between number of groups and the group size.

FIG. 2 depicts the graph showing dependence between number of groups 12 and the group size. Here the binomial distribution with parameters N and p is the discrete probability distribution of the number of successes in a sequence of N independent experiments, each of which can result in two values: success/failure where p is the probability of a successful result, q=1−p is the probability of failure. In this case the size of a group 12 is subject to the binomial distribution. Let the total number of records in the hash table 2 be N, the number of groups 12 is S, and it is known exactly that every key goes to one of these groups, then the probability that the key 4 will go to the certain group is:

$$p = \frac{1}{S}$$

The probability that the key 4 will not go into the certain group is:

$$q = 1 - p = 1 - \frac{1}{S}$$

If N is large enough, if the hash function 10 provides a uniform distribution of hash values 6 over the entire value range, and if p is fixed, then binomial distribution can be approximated to the Gaussian normal distribution. According to the local theorem of Moivre-Laplace:

$$P(x) \approx \frac{1}{\sqrt{2\pi Npq}} e^{-\frac{(x-Np)^2}{2Npq}}$$

For large N it is reasonable to select a large number of groups S, then the probability p is small, therefore:

$$pq = p(1-p) \approx p$$

hence:

$$P(x) \approx \frac{1}{\sqrt{2\pi\ Np}} e^{-\frac{(x-Np)^2}{2\ Np}}$$

The mathematical expectation of μ is the average group size equal to:

$$\mu = \frac{N}{S} = Np$$

Based on above said the dependence between number of groups and the group size can be represented in the following formula:

$$P(x) = \frac{S}{\sqrt{2\pi\mu}} e^{-\frac{(x-\mu)^2}{2\mu}}$$

Figure 3A:
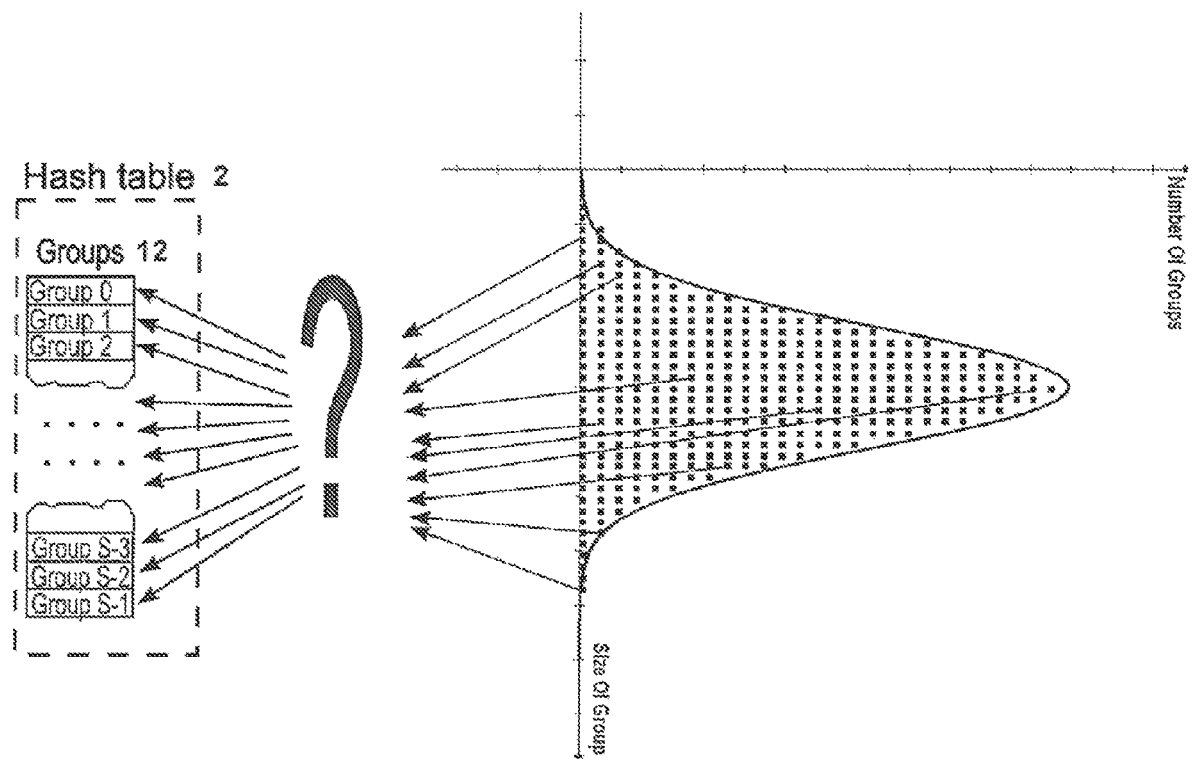
FIG. 3A is a depiction of invention where the groups of appropriate size are created.
Figure 3B:
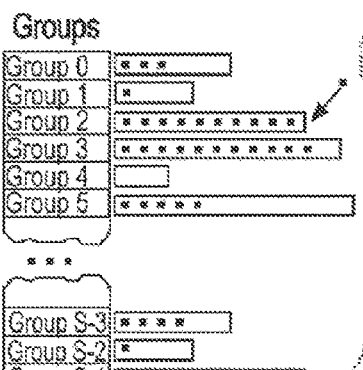
FIG. 3B is a depiction of invention where the groups of appropriate size are distributed over the hash table.
Figure 3B:
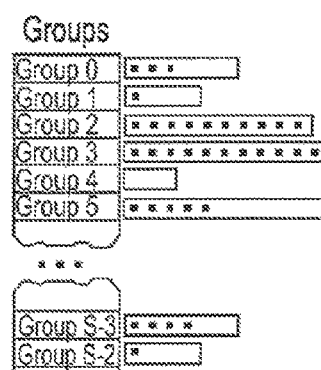
Figure 3B:
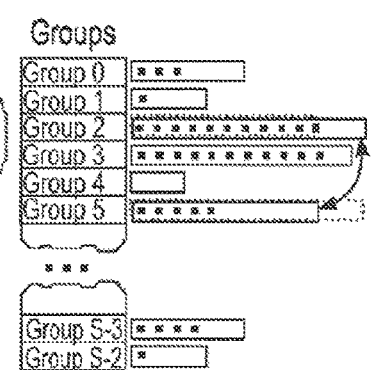

FIG. 3A and FIG. 3B show depiction of invention where the groups 12 of appropriate size are created and distributed over the hash table 2. Based on binominal distribution graph, even before the beginning of the hash table creation, knowing only the total number of records N and choosing the number of groups S, it is possible to predict how many groups 12 of certain size this table 2 contains. Further the groups 12 created according to the formula of $$P(x) = \frac{S}{\sqrt{2\pi\mu}} e^{-\frac{(x-\mu)^2}{2\mu}}$$

described in FIG. 2 are distributed randomly through the hash table 2 and then the table 2 is being filled. During the filling process if required actual size of the current group is more than randomly distributed, a larger group is searched, filled to an amount no greater than the current one. The content of the current group is copied into the found group, the contents of the found one is copied into the current one and then these two groups are swapped just by exchanging corresponding links in the groups array 12.

Figure 4:
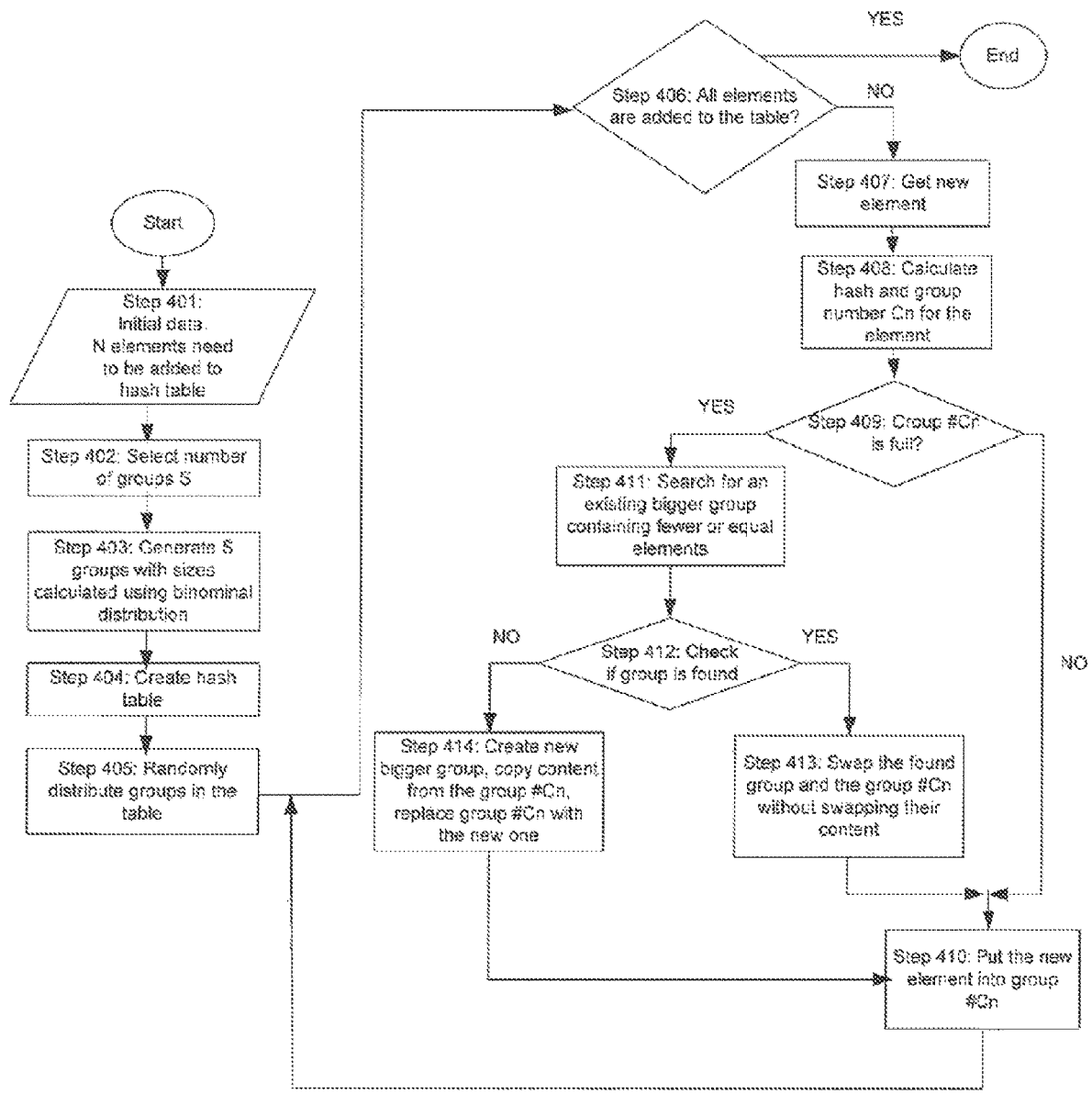
FIG. 4 is a flowchart of the invention where the algorithm for a hash table creating is presented.

FIG. 4 shows the flowchart where algorithm for a hash table creating is presented. In step 401 N elements need to be added to hash table 2. In step 402 the number of group S is selected. In step 403, S number of groups is generated, their sizes are calculated using binominal distribution method. Further the hash table 2 is created, step 404. In step 405 groups 12 are randomly distributed in the table 2. In step 406 it is checked if all elements are added to the table 2. If yes then the process is finished. If no, step 407, new element is got. In step 408 hash and group number Cn are calculated for the element. In step 409 it is checked if Group #Cn is full. If no, step 410, the new element is put into group #Cn. If yes, step 411, the existing bigger group containing fewer or equal number of elements is searched for. In step 412 it is checked if group 12 is found. If yes, step 413, the found group and the group #Cn are swapped without swapping their content. And the algorithm comes back to step 410, where the new element is put into group #Cn. If no, step 414, the new bigger group is created, the content is copied from the group #Cn, the group #Cn is replaced with the new one. And the new element is put into group #Cn, step 410. Then it is checked again if all elements are added to the table 12 and algorithm comes back to step 406.

Figure 5:
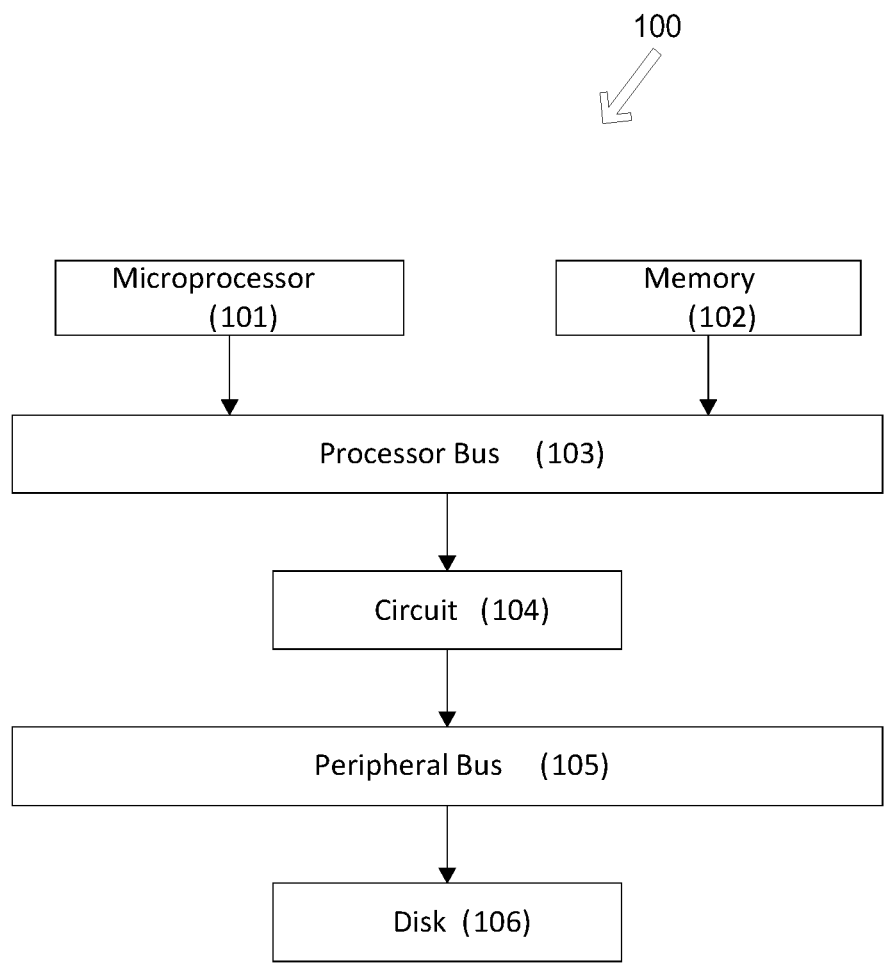
FIG. 5 is a schematic illustration of the connections of a computing system.
Figure 6:
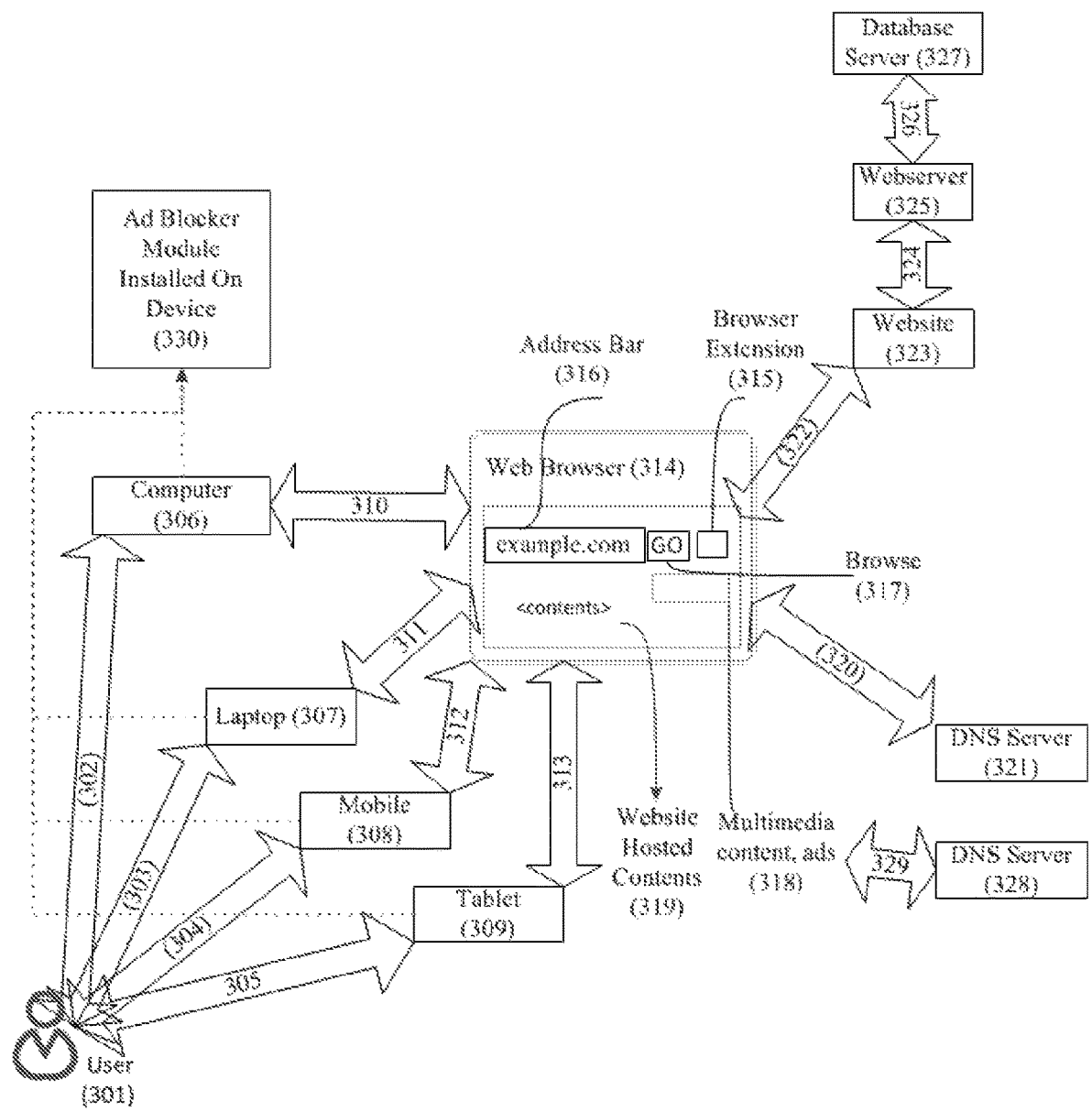
FIG. 6 is a schematic illustration showing how a user browses Internet and how different components act together to complete that browsing experience.
Figure 7:
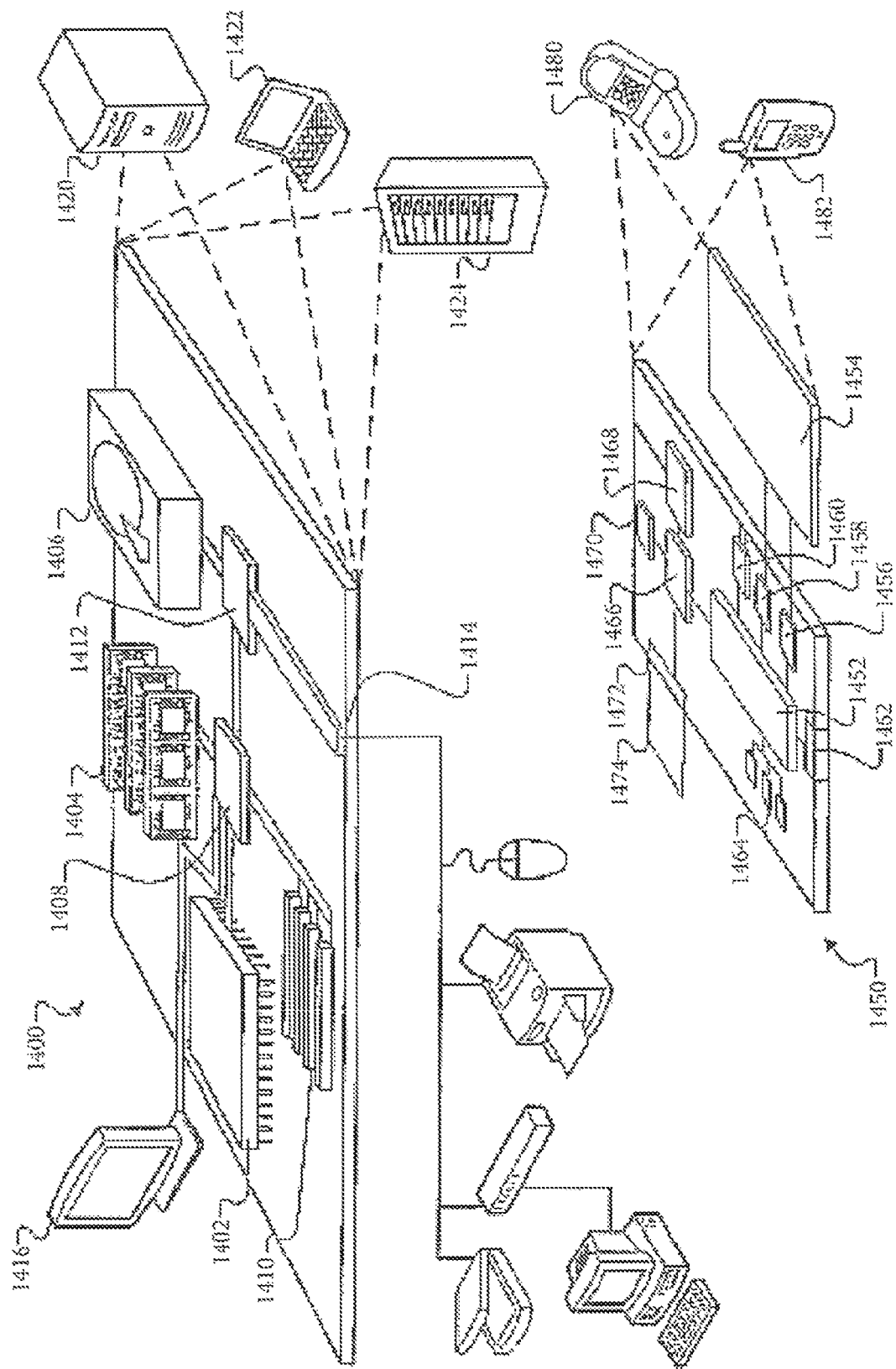
FIG. 7 is an illustration of a computer and mobile devices and their components.

The present invention is used with the following FIGS. 5, 6, and 7 of computer systems, components, and internet access. FIG. 5 illustrates a system of a computer or device which includes a microprocessor 101 and a memory 102 which are coupled to a processor bus 103 which is coupled to a peripheral bus 105 by circuitry 104. The bus 105 is communicatively coupled to a disk 106. It should be understood that any number of additional peripheral devices are communicatively coupled to the peripheral bus 105 in embodiments of the invention. Further, the processor bus 103, the circuitry 104 and the peripheral bus 105 compose a bus system for computing system 100 in various embodiments of the invention. The microprocessor 101 starts disk access commands to access the disk 106. Commands are passed through the processor bus 103 via the circuitry 104 to the peripheral bus 105 which initiates the disk access commands to the disk 106. In various embodiments of the invention, the present system intercepts the disk access commands which are to be passed to the hard disk.

FIG. 6 is a description of how communication works when the web is browsed and shows that a user (301) can use computer (306), laptop (307), mobile (308) or a tablet (309) to launch a web browser (314) installed on that specific device to browse a specific website (323). The user can enter an address of some chosen web site on the address bar (316) and press a browser specific option to indicate to the browser to browse, as shown in FIG. 5 via button "Go" (317). After a user presses a browser specific option to navigate to a given web page as shown in FIG. 5 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329.

In FIG. 6, browser extension (315) is shown to be installed in web browser that has capability to block any outgoing web request; and at the same time can block any html element present on web page using some pre-defined blacklist of outgoing URLs. At the same time a device may also be using one or other ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus depending on device setup, a web request may be blocked at browser level via ad blocker installed as browser extension (315) or may be blocked at network level using software module installed on device at network level and acting as ad blocker (330).

FIG. 7 shows an example of a computer device 1400 and a mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MIMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Described method allows to reduce the memory space required for certain system operation. The method shows how to use array 14 instead of linked list for storing elements of the group 12. All elements of array are located in memory one after another, while elements of linked list can be placed in different areas of the memory and each element should have a link to the following one for linking all elements to the one sequence. This leads to additional wasting of memory space for links but let dynamically change the size of the list. In comparison to linked list array saves memory and speeds up the access to each element, but it is necessary to know the size of the array 14 which is fixed for future iterations. Described method accurately determines the size of each group 12 from hash table 2 (excluding negligible error because of minor discrepancy in theoretical and practical distribution) before it is filled, what makes possible to store them in array 14.

Described method also reduces the memory fragmentation. Generally array can be used for the storage of group elements, but there is no way to accurately determine the group size in advance. Therefore in the beginning the size of array is determined preliminary and afterwards it is adjusted while the hash table is being filled. If the size of the array is not enough for storage of all groups' elements, there is created new array which has bigger size, the data from previous array is copied there, and previous array is deleted. Therewith the memory block, that contained deleted array, is marked as free and can be used by a process for storage of other objects. Repetition of such readjustment of array's size leads to memory fragmentation, i.e. the presence of free blocks in its different areas. But when applying described method it is possible to determine sizes of all arrays 14 for group storage and provide for them the separate memory block before the hash table 2 is formed. This way the extent of memory fragmentation is decreased.

Figure 8:
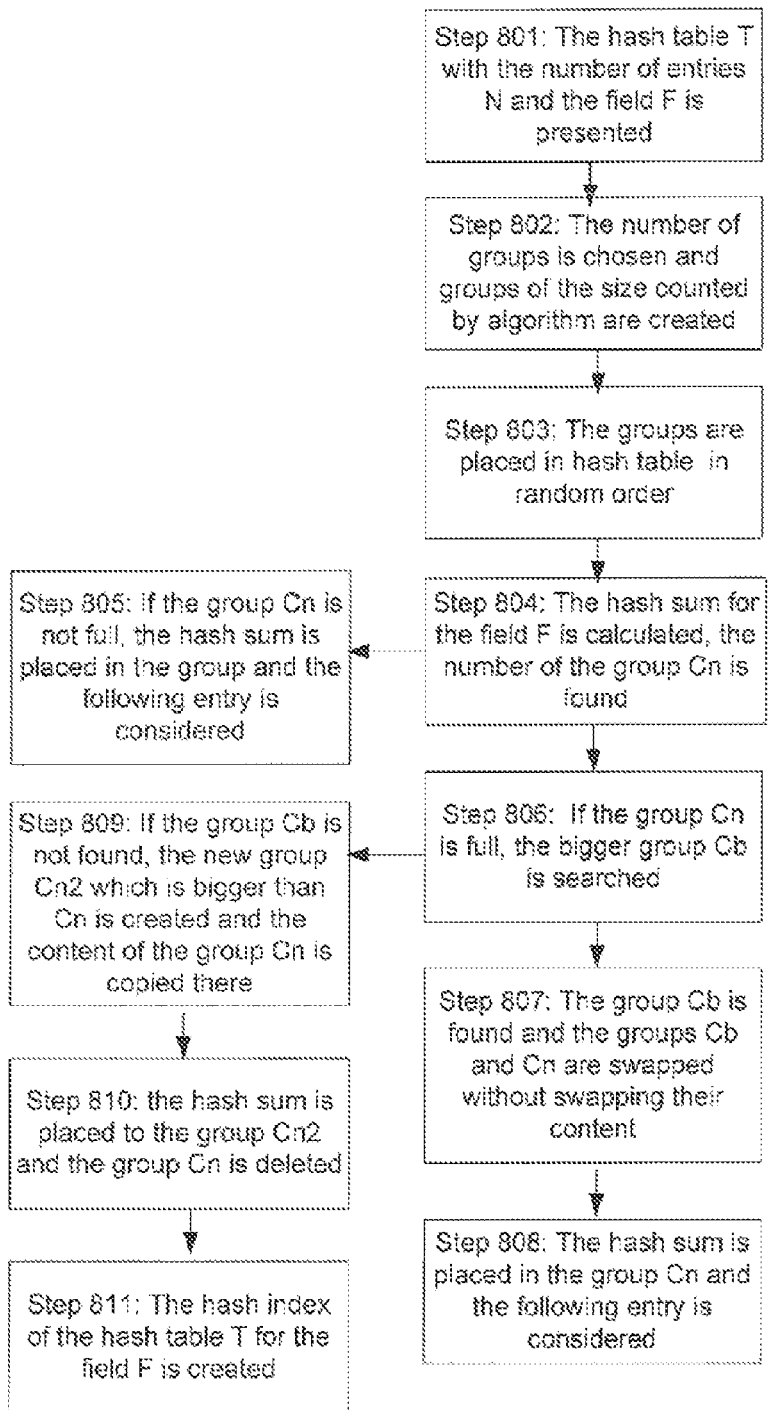
FIG. 8 is a flowchart of another embodiment of the method of the present invention applied in database management systems where the hash index for the hash table with several entries is created.

FIG. 8 is a flowchart of another embodiment of the invention method applied in database management systems (DBMS) where the hash index 16 for the hash table 2 with several entries is created. The hash index 16 is created by the command "CREATE INDEX index_name ON table_name.field_name TYPE HASH". In step 801 there is presented the hash table 2 named T with the number of entries N and the field F for which hash index 16 is being created. In step 802 the number of groups 12 is chosen and groups 12 of the size counted by formula $$P(x) = \frac{S}{\sqrt{2\pi\mu}} e^{-\frac{(x-\mu)^2}{2\mu}}$$

are created. In step 803 the groups 12 are placed in hash table 2 in random order. Further all entries of the hash table T are processed by the following algorithm. In step 804 the hash sum for the field F is calculated, based on this sum the number of the group Cn is found. In step 805, if the group Cn is not full, the hash sum is placed in the group and the following entry is considered. In step 806, if the group Cn is full, the bigger group Cb is searched, this group should have not more elements than group Cn. In step 807, the group Cb is found and the groups Cb and Cn are swapped without swapping their content, as a result the Cn group has free space. In step 808 the hash sum is placed in the group Cn and the following entry is considered. In step 809 if the group Cb is not found (the probability of it is very low), the new group Cn2 which is bigger than Cn is created and the content of the group Cn is copied there. In step 810 the hash sum is placed to the group Cn2 and the group Cn is deleted. In step 811, the hash index 16 of the hash table T for the field F is created.

The invention method is successfully applied when the system memory space is limited and its optimal usage is critical. Thus it is applied for microcontrollers or for systems with small on-chip memory. The hash index 16 for data of hash table 2 located in microcontroller memory is created by algorithm shown on FIG. 4, steps are the same as for DBMS.

Figure 9A:
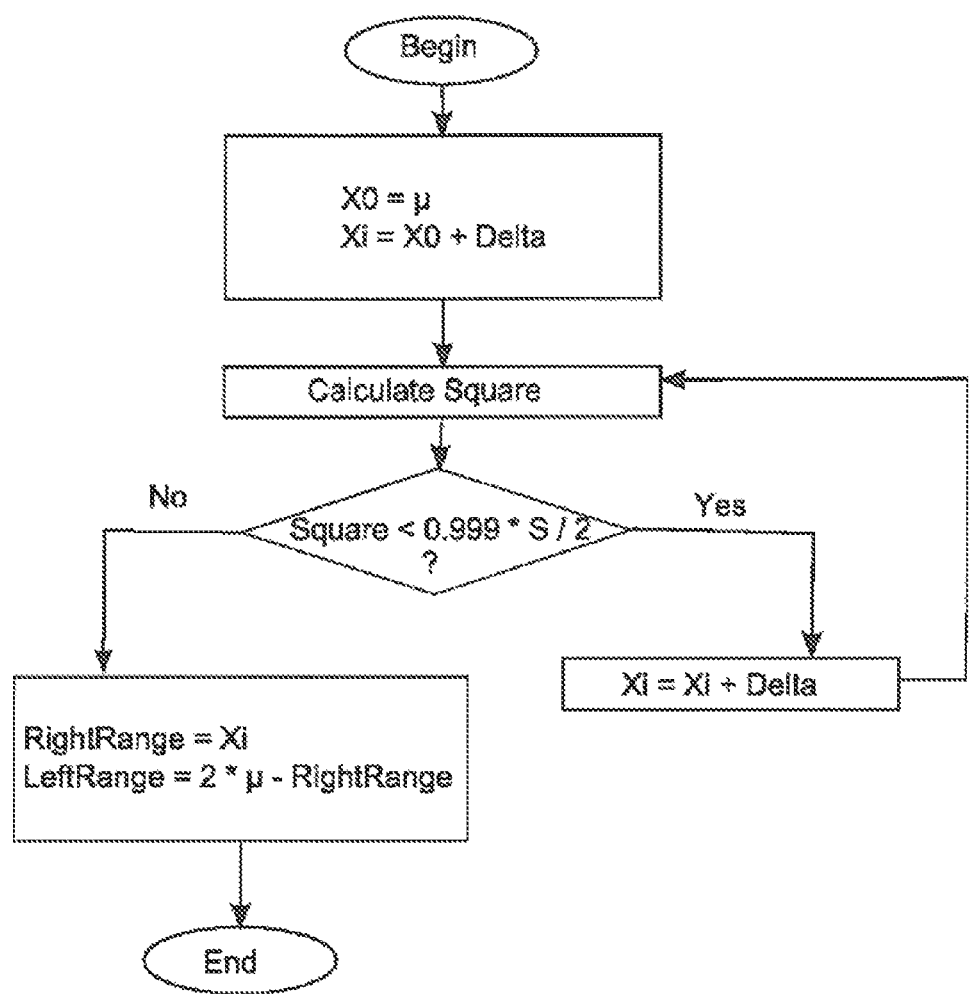
FIG. 9A is a depiction of another embodiment of the invention where there is defined the distribution of size of the group parameter.
Figure 9B:
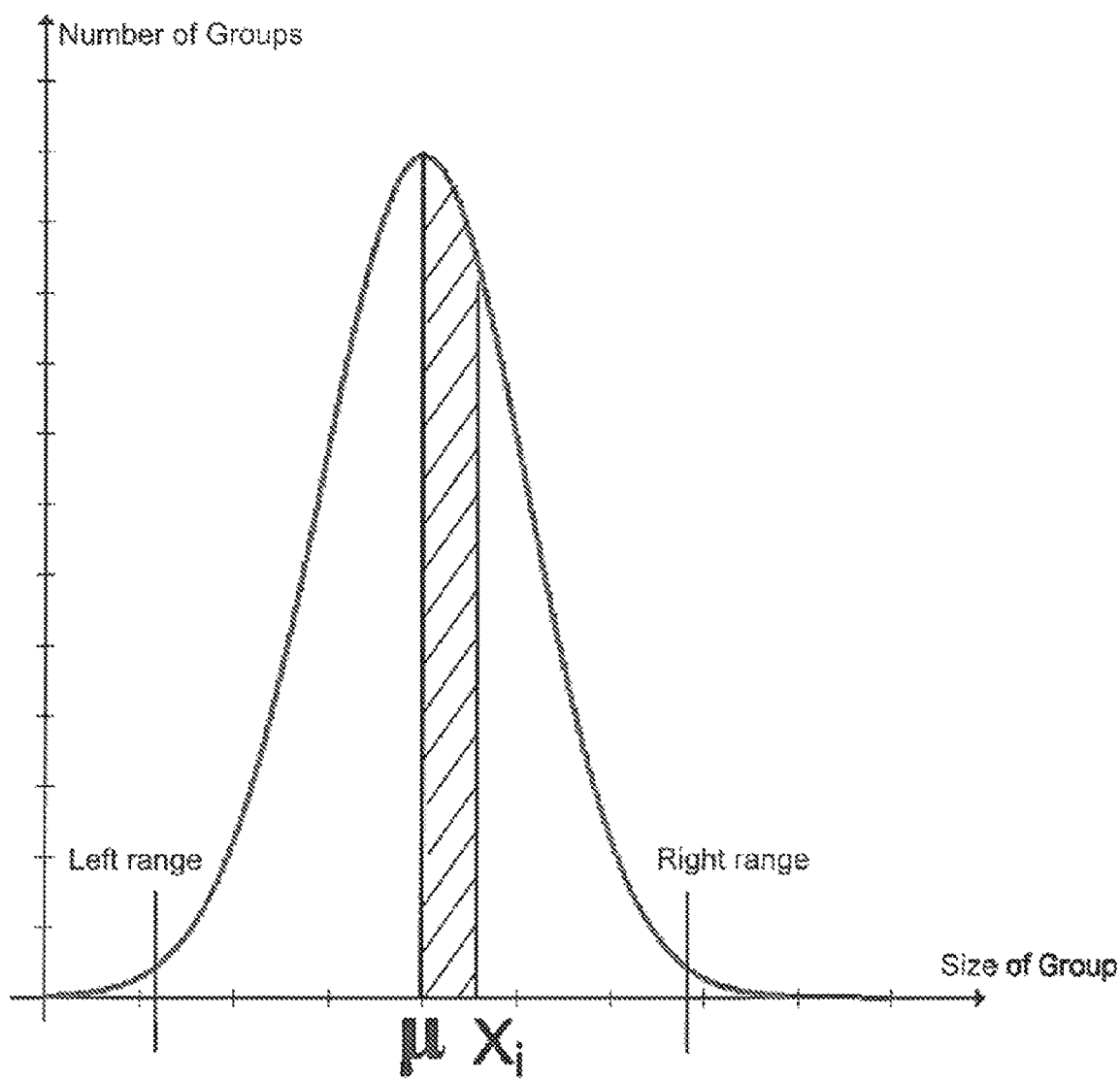
FIG. 9B is a depiction of another embodiment of the invention where there is defined the distribution of size of the group parameter.

FIGS. 9A and 9B are depictions of other embodiments of the invention where there is defined the distribution of size of the group parameter. Distribution of parameters in the formula $$P(x) = \frac{S}{\sqrt{2\pi\mu}} e^{-\frac{(x-\mu)^2}{2\mu}}$$

is defined from minus infinity to plus infinity where axis of abscissa is size of groups 12 and axis of the ordinates is number of groups 12 of determined size. But when the method is applied in practice, there exist left and right distribution limits or ranges. It means that there are minimal and maximal sizes of the groups 12, and the probability that the groups of smaller or bigger sizes do not appear is very high. To calculate this distribution limit the following algorithm can be used. The size of the group $X_0$ equals $\mu$ from the formula $$\mu = \frac{N}{S} = Np$$

the right limit Xi is counted as sum of the size of the group $X_0$ and Delta (Xi=$X_0$+Delta), where Delta is a small increment, for example, Delta equals 0.1. Then the area of the figure, limited by lines, indicating the size of groups on axis of abscissa (x=$\mu$, x=Xi), axis of abscissa and the distribution function of $$P(x) = \frac{S}{\sqrt{2\pi\mu}} e^{-\frac{(x-\mu)^2}{2\mu}}$$

is calculated. If the resulted area is less than 0.999*S/2, where S is the number of groups, then the chosen right limit is increased for Delta value (Xi=Xi+Delta). The area of the figure is calculated again. The algorithm is repeated till the area equals (0.999*S/2). The current value of Xi in this case is the maximal size of the group or the right distribution limit. The left distribution limit is symmetric to the right distribution limit respectively to $\mu$, therefore it is calculated by formula LeftRange=2*$\mu$–RightRange.

Figure 10:
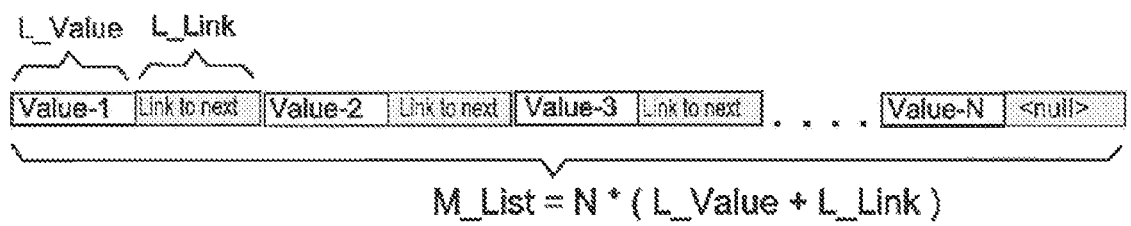
FIG. 10 is a depiction of another embodiment of the invention where the correlation between size of the value and the gain in memory usage is shown.
Figure 10:
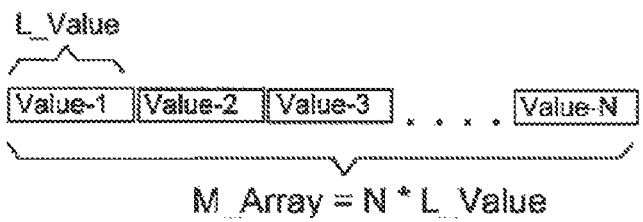

FIG. 10 is a depiction of other embodiment of the invention where the correlation between size of the value 6 and the gain in memory usage is shown. When there is applied linked list the occupied memory (M_list) equals the size of value 6 in bytes (L_value) and size of link to the next element in bytes (L_link) summarized for all values N. When there is applied the array 14 the occupied memory (M_array) equals the size of all values 6 in bytes (L_value) since links are not used. Correspondingly the lesser the size of value 6 in array 14 the more gain in memory usage is got in comparison with linked list method. For example, if size of value 6 equals size of the link to the next element there is a double gain in memory usage. So the effectiveness of the invention method increases if the size of value 6 is relatively small, nevertheless there is some gain in memory usage for any size of link and size of value.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method to optimize memory usage when creating hash tables comprising:
    organizing a data storage in a hash table whereas said hash table includes keys and values;
    calculating a key for each real object, using a hash function, to create said keys and said values and uniting said keys and said values in groups;
    storing elements of said groups in arrays instead of linked lists;
    predicting sizes of said arrays using binomial distribution method; and
    optimizing memory usage by reducing memory space required for system operation and speeding up access to each of said elements by using said arrays for storing said elements of said groups instead of said linked lists.

2. The method to optimize memory usage when creating hash tables according to claim 1, where the size of said arrays is determined using binomial distribution method comprising:
    applying binomial distribution method;
    determining the size of said group of keys, calculated for each real object in said hash table, as a subject to the binomial distribution;
    determining the total number of records in said hash table and the number of groups;
    determining the probability that said key will go to the certain group;
    approximating binomial distribution to the Gaussian normal distribution if the total number of records is large enough and if said hash function provides a uniform distribution of hash values over the entire value range; and
    determining the average group size and dependence between number of groups and the group size.

3. The method to optimize memory usage when creating hash tables according to claim 1, where there is organized said data storage in said hash table with said arrays instead of linked lists comprising:
    creating said groups with sizes calculated using binomial distribution method;
    distributing said groups randomly through said hash table;
    correcting the random distribution to actual distribution by searching larger group, which is filled as the current group or less if required actual size of the current group is more than randomly distributed; and
    applying the following steps for adding the new element to the already full group: copying the content of the current group into the found group, copying the content of the found group into the current group and then swapping these two groups by exchanging corresponding links in the groups' array; as a result the current group has extra free space to add new element.

4. The method to optimize memory usage when creating hash tables according to claim 1, where the memory space required for certain system operation is reduced comprising:
    using said array, which elements are located in memory one after another, for storing elements of said group instead of linked list thus saving memory space and speeding up the access to each element;
    determining the size of each group from said hash table before it is filled, what makes possible to store them in said array.

5. The method to optimize memory usage when creating hash tables according to claim 1, where the memory fragmentation is reduced comprising:
    determining the size of the array preliminary and adjusting it while the hash table is being filled;
    creating new array of a bigger size if the size of the previous array is not enough for storage of all groups' elements;
    copying the data from previous array to the new array;
    deleting the previous array; and
    marking the memory block, that contained deleted array, as free for further usage by a process for storage of other objects.

6. The method to optimize memory usage when creating hash tables according to claim 1 applied in database management systems, wherein a hash index for said hash table with several entries is created comprising:
    presenting said hash table named T with the number of entries N and the field F for which said hash index is being created;
    choosing the number of groups and creating said groups with sizes calculated using binomial distribution method;
    placing said groups in said hash table in random order;
    calculating the hash sum for the field F; based on this sum the number of the group Cn is found;
    placing the hash sum in the group if the group Cn is not full, and considering next entry;
    searching for bigger group Cb, with not more elements than group Cn, if the group Cn is full;
    swapping the groups Cb and Cn without swapping their content if the group Cb is found whereas the Cn group has free space;
    placing the hash sum in the group Cn and considering the next entry;
    creating new group Cn2, which is bigger than Cn, and copying there the content of the group Cn if the group Cb is not found; and
    placing the hash sum to the group Cn2 and deleting the group Cn, therefore the hash index of the hash table T for the field F is created.

7. The method to optimize memory usage when creating hash tables according to claim 6, applied for microcontrollers or for systems with small on-chip memory, wherein said hash index for data located in microcontroller memory is calculated.

8. The method to optimize memory usage when creating hash tables according to claim 1, wherein there is defined the distribution of size of the group parameter or left and right distribution limits comprising:
- determining the size of the group and a small increment on which the size of the group is gradually increased for defining the right distribution limit;
- calculating the area of the figure, limited by lines, indicating the size of groups on axis of abscissa, axis of abscissa and a distribution function;
- increasing the current right distribution limit for said small increment, if the resulted area of the figure is less than half of the amount of number of groups multiplied in 0.999;
- calculating the area of the figure again;
- repeating the algorithm till the area equals the amount of number of groups multiplied in 0.999;
- determining the right distribution limit as maximal size of the group received in the result of the calculations;
- determining the left distribution limit which is symmetric to the right distribution limit respectively to the group size.

9. The method to optimize memory usage when creating hash tables according to claim 1, wherein the lesser the size of said value in said array the more gain in memory usage is obtained in comparison with linked list method.

10. The method to optimize memory usage when creating hash tables according to claim 1, where said organizing step is:
- organizing said data storage in said hash table whereas said hash table includes keys only.

* * * * *